Figure 1:
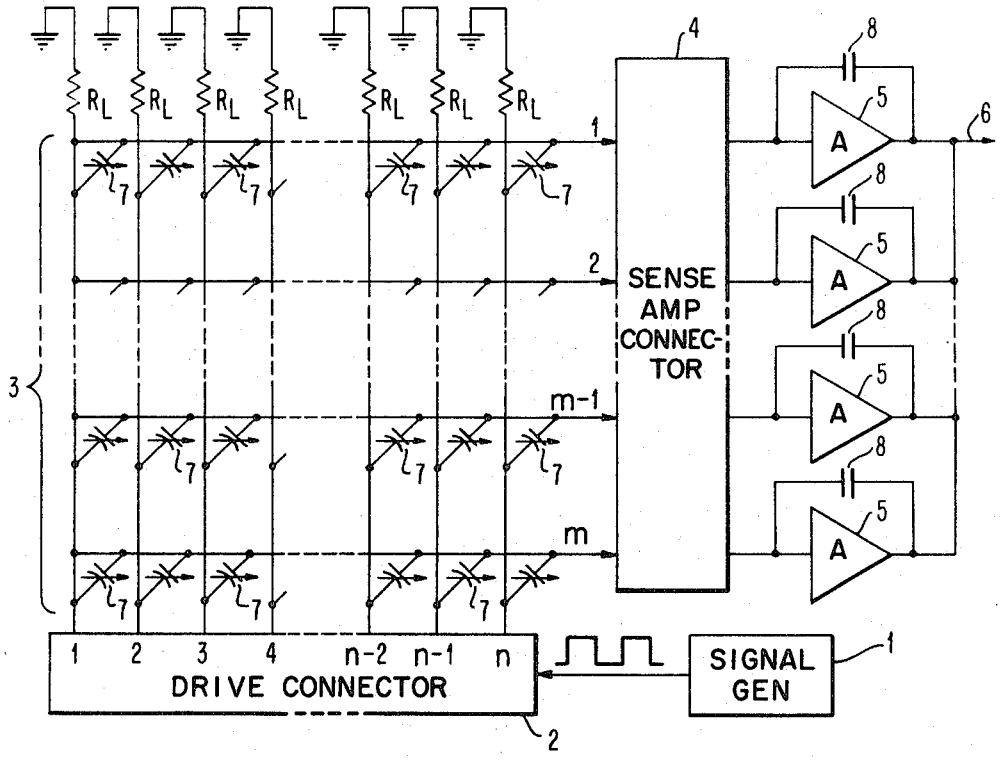
Figure 2:
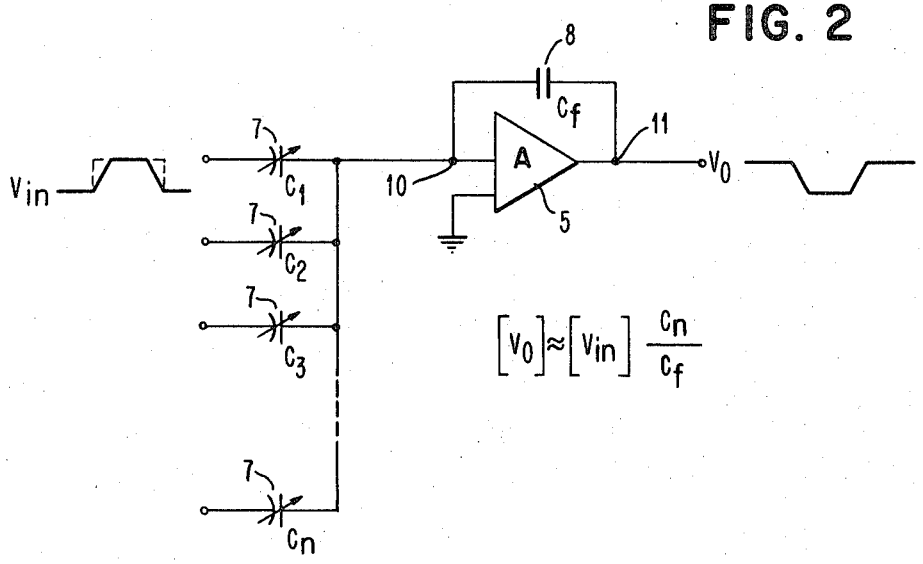
Figure 3:
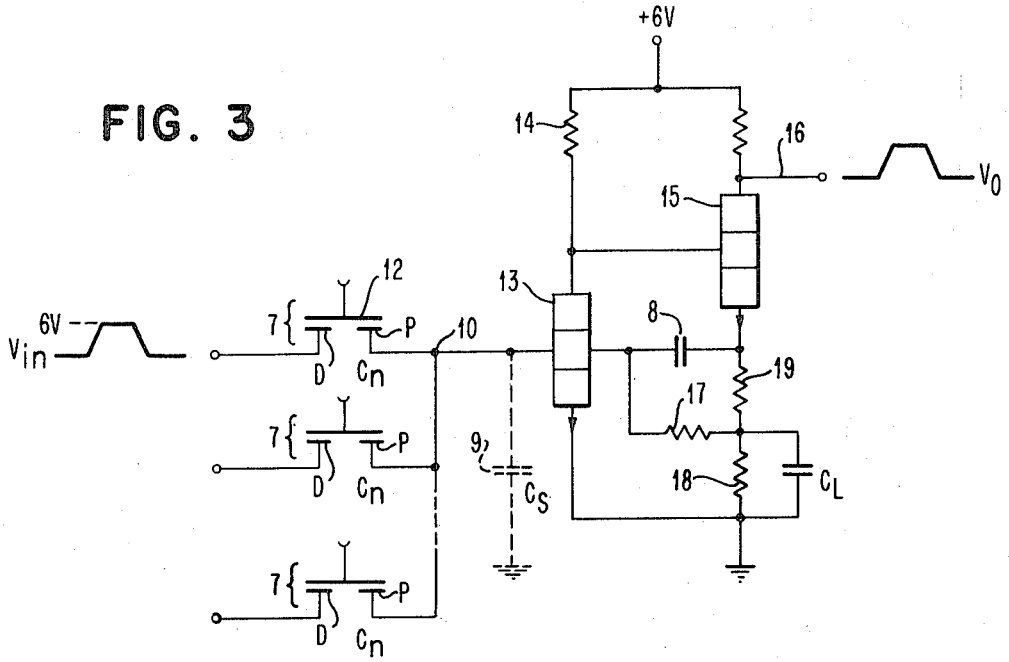
Figure 4:
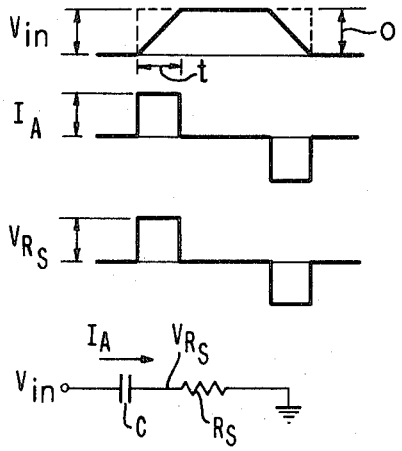
Figure 5:
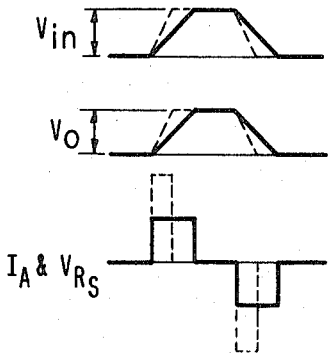

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 7

T904,008

CAPACITIVE MATRIX SENSING METHOD AND APPARATUS

William George Crouse, Raleigh, N.C., assignor to International Business Machines Corporation, Armonk, N.Y.

Filed Nov. 30, 1971, Ser. No. 203,390
**Int. Cl. G08c *1/00***
U.S. Cl. 340—365 C
2 Sheets Drawing. 14 Pages Specification

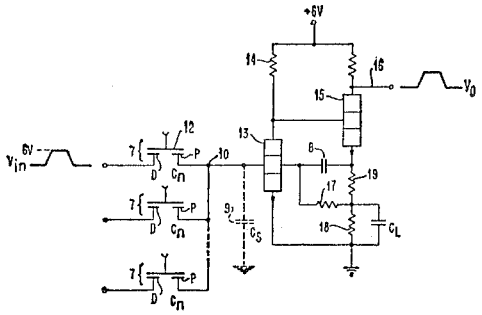

A low impedance current integrating amplifier is utilized as a sensor for a high impedance capacitive matrix in which changes in capacitance at the cross points of the matrix which depart from a given threshold value are to be sensed.

CAPACITIVE MATRIX SENSING METHOD AND APPARATUS

Filed Nov. 30, 1971 2 Sheets-Sheet 1

CAPACITIVE MATRIX SENSING METHOD AND APPARATUS

Filed Nov. 30, 1971 2 Sheets-Sheet 2